United States Patent [19]

Finn

[11] 4,036,342
[45] July 19, 1977

[54] INCHING VALVE WITH MEANS PREVENTING HIGH PRESSURE INCHING

[75] Inventor: David S. Finn, Metamora, Ill.

[73] Assignee: Towmotor Corporation, Mentor, Ohio

[21] Appl. No.: 700,281

[22] Filed: June 28, 1976

[51] Int. Cl.² .......................................... F16D 25/062
[52] U.S. Cl. .............................. 192/109 F; 137/116.3
[58] Field of Search .......................... 192/109 F, 85 R; 137/116.3

[56] References Cited

U.S. PATENT DOCUMENTS

| | | | |
|---|---|---|---|
| 2,939,557 | 6/1960 | Dabich et al. | 192/109 F |
| 3,463,278 | 8/1969 | Broeker et al. | 192/109 F |
| 3,957,145 | 5/1976 | Kitano et al. | 192/13 R |

*Primary Examiner*—Benjamin W. Wyche
*Attorney, Agent, or Firm*—Oscar G. Pence; John W. Grant

[57] ABSTRACT

A pressure limiting arrangement is disclosed for automatically reestablishing full clutch engagement pressure to a hydraulic pressure actuated clutch of a vehicle whenever the operator, by the manipulation of an inching valve, attempts to slip the clutch above a predetermined partial engagement pressure and includes a mechanical biasing device connected to the inching valve and effective in overriding the manual control thereof to shift the valve to its full clutch engaging position, an actuator connected for effecting the disengagement of the biasing device to allow normal operation of the valve, and a control system to effect the selective operation of the actuator and including a first device responsive to a predetermined application of the manual control member of the valve to effect the initial disengagement of the biasing device and a second device responsive to the predetermined partial clutch engagement pressure to effect the reengagement of the mechanical biasing device.

7 Claims, 1 Drawing Figure

U.S. Patent    July 19, 1977    4,036,342
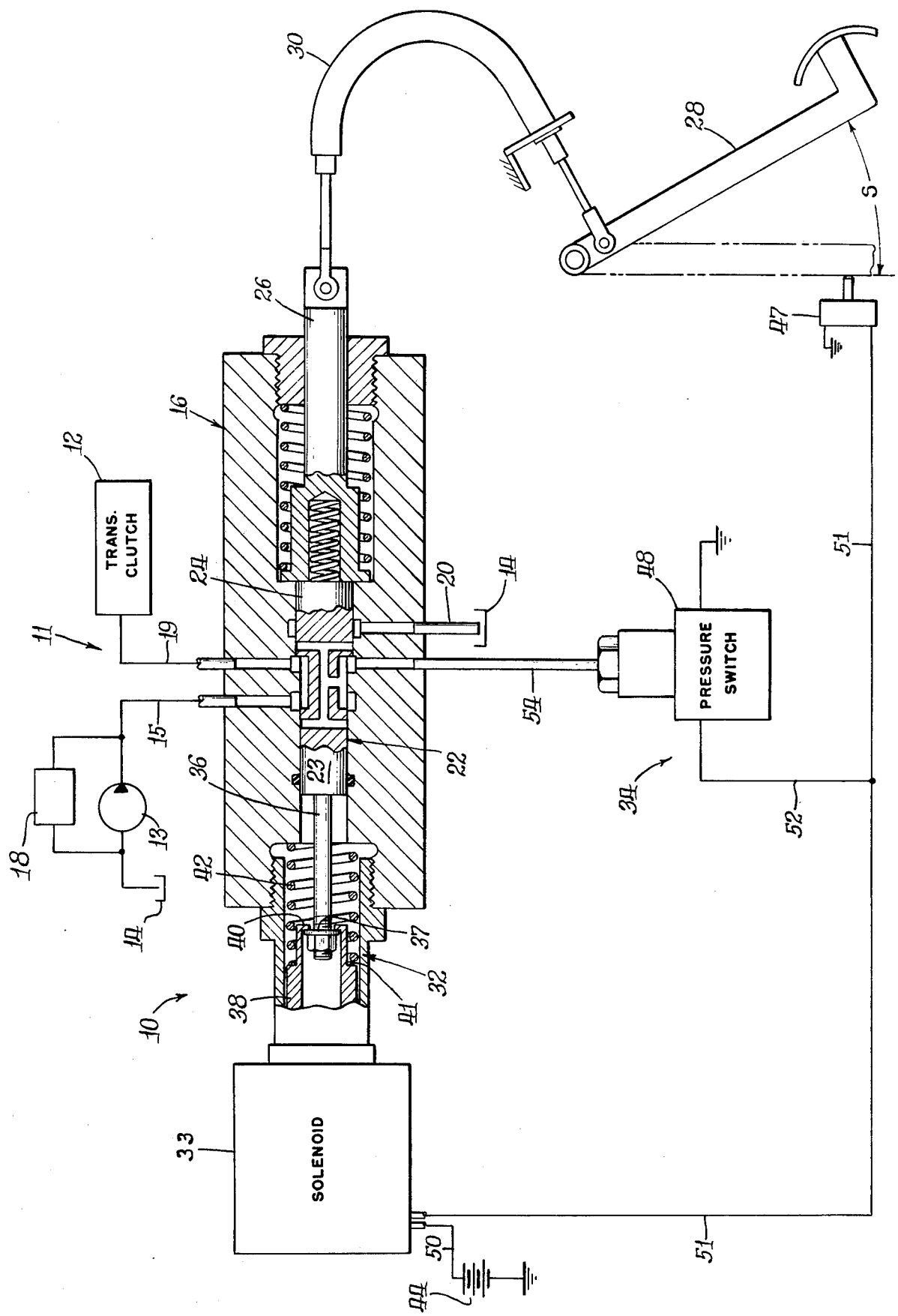

INCHING VALVE WITH MEANS PREVENTING HIGH PRESSURE INCHING

BACKGROUND OF THE INVENTION

This invention generally relates to inching valves for modulating hydraulic fluid to a hydraulic clutch of an automatic or powershift transmission, and more particularly to a pressure limiting arrangement to prevent the operator from modulating such hydraulic fluid above a predetermined partial clutch engagement pressure.

It is frequently desireable to operate the engine of a work vehicle, such as a lift truck or the like, at a relatively high speed to provide the power necessary for the operation of an implement, such as a lift mast, while moving the vehicle at a relatively slow speed, commonly called inching. This provides the operator with precise control over the vehicle to permit, for example, the critical maneuvering necessary for picking up or discharging a load. In vehicles with automatic or powershift transmissions, this is normally accomplished by providing a hydraulic clutch controlled by an inching valve. Such valve is normally actuated by a foot pedal so that by depressing the pedal, the hydraulic pressure necessary to keep the clutch fully engaged is interrupted, thereby allowing the clutch to slip.

Typically, inching valves can control the fluid pressure to the clutch to either completely disengage the clutch or effect its partial engagement. Thus, the valve controls the pressure of the fluid to the clutch from a substantially zero pressure to its full engagement pressure. However, most clutches are not designed to withstand being slipped for any appreciable length of time above a predetermined partial engagement pressure which may be substantially below its full engagement pressure. As a consequence, the prior inching valves have been adapted to permit the operator to freely modulate clutch pressure within a predetermined low pressure range, but to shift abruptly to full clutch actuation pressure whenever such low pressure range is exceeded.

Unfortunately, this abrupt modulation of pressure still requires a small, but definite amount of spool travel, which has, in the past, enabled a skilled operator to modulate the pressure to the clutch above this desired limit, ultimately resulting in a premature failure of the transmission.

SUMMARY AND OBJECTS OF THE INVENTION

Accordingly, it is an object of this invention to provide a pressure limiting arrangement for a hydraulic clutch inching valve which is effective in overriding the manual control of the valve to prevent the modulation of the clutch actuating fluid above a predetermined partial engagement pressure of the clutch.

Another object of this invention is to provide such a pressure limiting arrangement which completely removes all operator control over the valve in reestablishing full clutch actuating pressure to the clutch once the predetermined partial pressure is reached.

Another object of this invention is to eliminate the normal mechanical link between the operator and the inching valve during the recovery of the valve to its full clutch actuating position once the predetermined partial pressure has been reached to prevent his manipulation thereof.

Other objects and advantages of the present invention will become more readily apparent upon reference to the accompanying drawing and following description.

BRIEF DESCRIPTION OF THE DRAWING

The drawing is a generally schematic diagram of an inching control system for a vehicle transmission in which a pressure limiting arrangement embodying the principles of the present invention is employed.

DETAILED DESCRIPTION OF THE PREFERRED EMBODIMENT

Referring more particularly to the drawings, a pressure limiting arrangement embodying the principles of the present invention is generally indicated at 10 in association with a clutch control system 11 for selectively engaging and disengaging a hydraulic clutch 12 of an automatic transmission for a work vehicle, such as a lift truck or the like, neither of which are shown. The clutch control system 11 includes a hydraulic pump 13 connected for drawing fluid from a tank 14. Such pump, it will be understood, is capable of supplying a maximum clutch engagement pressure to effect the full engagement of the clutch necessary to prevent clutch slippage. The pressurized fluid is conducted from the pump through a conduit 15 to a hydraulic clutch inching valve 16. A pressure regulating and relief valve 18 is preferably interconnected between the conduit 15 and the tank 14 for controlling the pressure from the pump and for relieving undue pressures from the system in a normal manner.

In a manner hereinafter more fully described, the pressurized fluid to the inching valve is conducted either to the clutch 12 through a conduit 19 or to the tank 14 through a conduit 20. In this regard, the inching valve includes a reciprocably mounted valve spool 22 having opposite first and second end portions 23 and 24, respectively. The valve spool is variably shiftable in a leftward direction to a first position in which it is shown and in a rightward direction to a second position, not shown. In the first position, the valve spool is constructed so as to direct the maximum clutch engagement pressure available from the pump 13 to the clutch 12 to effect its full engagement. In the second position, the pump and the clutch are both connected to tank so that the clutch will be substantially completely disengaged. It will also be understood that the spool is also variably positionable between the first and second positions so as to modulate the fluid to the clutch to effect its partial engagement, thereby permitting a controlled amount of clutch slippage to occur.

The valve also includes suitable means for biasing the valve spool toward its second position in response to fluid pressure in the valve. In the present valve as shown in the drawing, such means is provided by having the second end portion 24 of the valve spool larger than its first end portion 23 to provide an area differential therebetween which is exposed to fluid pressure in the valve.

Manual control apparatus 25 is provided for normally positioning the valve spool between its first and second positions. Such apparatus includes a spring biased plunger 26 which is mounted for abutting the second end portion 24 of the valve spool for limiting the travel of the spool in response to the fluid pressure in the valve. The position of the plunger 26 is preferably controlled by an inching control foot pedal 28. The pedal is mechanically connected to the plunger 26 in any suitable manner, such as by a pushpull cable 30. The pedal has a predetermined stroke, designated by the letter S on the drawing, which is sufficient to move the plunger 26 to allow the valve spool 22 to shift from its first position to its second position.

It will be appreciate that the above described components of the clutch control system 11 are of a conventional construction and that any variations thereof well known in the art may be used in association with the present pressure limiting arrangement 10 now to be described.

In accordance with the present invention, the pressure limiting arrangement 10 includes mechanical biasing apparatus 32, an electrical actuator or solenoid 33 and control means 34 for selectively energizing the solenoid to control the effect of the biasing apparatus on the valve spool 22 of the inching valve 16. The mechanical biasing apparatus 32 includes an elongaged stem 36 extending from the first end portion 23 of the valve spool 22. A nut retained washer provides a radially extending flange 37 adjacent the distal end of the stem 36. The biasing apparatus also includes a tubular sleeve 38 which is slidably mounted about the stem 36 and includes an inwardly extending flange portion 40 for abutting the washer 37. The sleeve is also provided with a radially disposed shoulder 41 for providing a seat for one end of a coil spring 42 which has its opposite end seated against the inching valve 16. Thus, the biasing apparatus 32 is effective in biasing the valve spool 22 in a leftward direction toward its first position. The spring 42 has sufficient force to overcome that of the fluid pressure on the valve spool, tending to shift the spool toward the right, thereby overriding such fluid pressure.

The control means 34 includes a source of electrical energy or battery 44, and first and second switvhes 47 and 48, respectively. The battery 44 is connected to the solenoid 33 by a first lead 50. The first and second switches are connected in parallel to the solenoid by a second lead 51 and a branch lead 52, respectively.

The second switch is a normally closed pressure switch connected by a conduit 54 to the inching valve 16 so as to be in communication with the clutch actuation pressure for the hydraulic clutch 12. The pressure switch is responsive to a predetermined pressure level to open the circuit to the solenoid whenever the actuating fluid to the clutch is above such pressure level. In this regard, it will be appreciated that the predetermined pressure level is selected to coincide with the pressure necessary to effect the partial engagement of the clutch which might possibly damage the clutch or transmission if continuous slipping of the clutch were allowed to occur.

The first switch 47 is a normally open, spring biased type which only remains closed as long as a closing force is being applied thereto. Such closing force is applied by the inching pedal 28 when such pedal is depressed. In the drawing, the switch 47 is shown as being actuated by the pedal at the bottom of its stroke, as shown in phantom lines. It will be understood that this is merely for convenience as such is not required for the function of the present invention which only requires that the first switch be closed whenever the pedal moves a sufficient distance to normally modulate the pressure to the clutch below the predetermined partial clutch engagement pressure at which the pressure switch 48 opens.

The solenoid 33 is connected to the inching valve 16 for shifting the tubular sleeve 38 inwardly or to the right in the drawing when the solenoid is energized by the closure of either of the first or second switches 47 and 48. Such inward shifting of the sleeve 38, as will be apparent, disengages its flange portion 40 from the washer 37 of the stem 36, thereby permitting the valve spool 22 to shift in response to fluid pressure in a normal manner.

Operation of the Preferred Embodiment

While the operation of the present invention is believed to be clearly apparent from the foregoing description, further amplification will be made in the following brief summary of such operation. Firstly, it will be understood that when the vehicle is in operation, the pump 13 is effective in delivering hydraulic fluid at a sufficient pressure to fully engage the clutch 12, preventing its slipping even under full engine load. If during such operation, the operator desires to operate the vehicle with its engine at a relatively high speed for supplying power to other implements or the like, while moving the vehicle at a very slow speed, he can do this by stepping on the inching pedal 28 so as to partially disengage the clutch 12, permitting the clutch to slip.

The depression of the inching pedal 28, it will be understood, causes the plunger 26 to move to the right in the drawing. Normally, this will allow the valve spool 22 to shift to the right under the influence of fluid pressure. However, with the present limiting arrangement 10 being employed, the valve spool is held in its first position by the solenoid 33 until the first switch 47 is closed by the pedal 28. As the plunger is already moved away from the valve spool when this occurs, the valve spool 22 is free to move under the influence of the fluid pressure acting thereon so as to shift toward its second position, thereby communicating the clutch to tank to effect its disengagement. As this occurs, the pressure acting upon the pressure switch 48 drops below its opening or predetermined pressure so as to also energize the solenoid 33. Consequently, the operator is free to modulate the pressure to the clutch within a range from a minimal pressure sufficient to completely disengage the clutch up to the predetermined partial engagement pressure setting of the pressure switch 48. It will be understood that the minimal pressure is normally about 0 psig, while the full clutch actuating pressure is typically about 175 psig. Within this range, the predetermined pressure setting for the pressure switch 48 is preferably between about 25 to 35 psig.

The preceding pressure modulation is accomplished by the operator backing off on the pedal 28 until the desired amount of clutch slippage is obtained. As this happens, it will be appreciated that the pedal 28 will move away from the first switch 47, thereby allowing the switch to open. The solenoid 33, however, will remain energized due to the pressure switch 48 being closed. Such pressure switch will remain closed until the clutch pressure rises above the predetermined pressure either by the operator's complete release of the pedal 28 or by his attempt to modulate the pressure to effect slipping of the clutch above the predetermined partial engagement pressure. However, when this happens the switch 48 is effective in de-energizing the solenoid 33, thereby allowing the spring 42 to shift the valve spool 22 leftwardly to its first position. It will be understood that the operator has no control over the return of the valve spool and he must again fully depress the pedal 28 so as to reclose the first switch 47 before the solenoid will be energized to allow has further modulation of the clutch.

While the invention has been described and shown with particular reference to the preferred embodiment, it will be apparent that variations might be possible that would fall within the scope of the present invention, which is not intended to be limited except as defined in the following claims.

What is claimed is:

1. In a control system for a hydraulic pressure actuated clutch including an inching valve variably shiftable between a full clutch engaging position and a clutch disengaging position and a manual control member connected for normally shifting the valve between said positions for controllably varying the clutch engaging pressure, a pressure limiting arrangement for automatically reestablishing full clutch engagement pressure to the clutch whenever partial clutch engagement pressure exceeds a predetermined level, said arrangement comprising:

biasing means connected to said inching valve sufficient to shift the valve to its full clutch engaging position irrespective of the operation of the manual control apparatus;

actuator means connected for disengaging said biasing means; and control means for selectively operating said actuator means and including first means responsive to the application of said manual control member to effect the disengagement of said baising means upon a predetermined application of said member, and second means responsive to said clutch engagement pressure for effecting the reengagement of the biasing means when said pressure exceeds a predetermined level.

2. The arrangement of claim 1 wherein said actuator means is a solenoid.

3. The arrangement of claim 2 wherein said first means is a mechanical switch mounted for actuation by said manual control member when said member is actuated beyond a position normally sufficient to modulate the clutch engagement pressure to a level at least below said predetermined level.

4. The arrangement of claim 3 wherein said second means is a pressure switch connected in communication with the fluid pressure for engaging said clutch.

5. The arrangement of claim 4 wherein said control means includes electrical circuit means including a source of electrical energy and means for interconnecting said source of electrical energy with said solenoid and said switches so that said solenoid is energized whenever either of said switches is closed.

6. The arrangement of claim 5 wherein said inching valve includes a reciprocably mounted valve spool having a first end portion and movable in one direction to effect the first position of the valve and in the opposite direction to effect the second position thereof; and wherein said mechanical biasing means includes an elongated stem extending from said first end portion of the valve spool and having a radially extending flange adjacent its distal end, a tubular sleeve slidably mounted about said stem and having a mating flange thereon for abutting said flange of the stem and a radially disposed shoulder thereabout, and a coil spring mounted between said shoulder of the sleeve and the inching valve for biasing said spool in said first direction through the abutting engagement of said flanges.

7. The arrangement of claim 6 wherein said solenoid is operatively connected to said sleeve for effecting the compression of said spring when said solenoid is energized so as to disengage the mating flange of the sleeve from the flange of the stem of the valve spool to permit the movement of the spool in said opposite direction.

* * * * *